United States Patent [19]
Shibazaki

[11] Patent Number: 5,809,257
[45] Date of Patent: Sep. 15, 1998

[54] BUS CONTROL APPARATUS FOR DATA TRANSFER SYSTEM

[75] Inventor: Shogo Shibazaki, Yokohama, Japan

[73] Assignee: Fujitsu Limited, Kawasaki, Japan

[21] Appl. No.: 584,548

[22] Filed: Jan. 11, 1996

[30] Foreign Application Priority Data

Jan. 10, 1995 [JP] Japan .................................. 7-001810
Jan. 9, 1996 [JP] Japan .................................. 8-001638

[51] Int. Cl.$^6$ .................................................. G06F 13/00
[52] U.S. Cl. .................. 395/287; 395/309; 365/189.01; 365/189.05; 365/230.08
[58] Field of Search .................................. 395/287, 290, 395/444, 309; 365/185.44, 221, 201, 230.05, 189.01, 194, 230.08; 358/404

[56] References Cited

U.S. PATENT DOCUMENTS

| | | |
|---|---|---|
| 4,392,200 | 7/1983 | Arulpragasam et al. . |
| 4,494,149 | 1/1985 | Furukawa . |
| 4,680,491 | 7/1987 | Yokouchi et al. . |
| 4,864,491 | 9/1989 | Ohuchi . |
| 5,200,600 | 4/1993 | Shinagawa . |

OTHER PUBLICATIONS

English language Abstract and Japanese Patent Laid–Open Publication No. 60–145725, issued Aug. 1, 1985.
English language Abstract and Japanese Patent Laid–Open Publication No. 63–84316, issued Apr. 14, 1988.
English language Abstract and Japanese Patent Laid–Open Publication No. 63–208965, issued Aug. 30, 1988.
English language Abstract and Japanese Patent Laid–Open Publication No. 1–196634, issued Aug. 8, 1989.
English language Abstract and Japanese Patent Laid–Open Publication No. 2–109414, issued Apr. 23, 1990.
English language Abstract and Japanese Patent Laid–Open Publication No. 2–272940, issued Nov. 7, 1990.
English language Abstract and Japanese Patent Laid–Open Publication No. 2–287662, issued Nov. 27, 1990.
English language Abstract and Japanese Patent Laid–Open Publication No. 3–53354, issued Mar. 7, 1991.
English language Abstract and Japanese Patent Laid–Open Publication No. 3–233639, issued Oct. 17, 1991.
English language Abstract and Japanese Patent Laid–Open Publication No. 5–216818, issued Aug. 27, 1993.
English language Abstract and Japanese Patent Laid–Open Publication No. 5–304461, issued Nov. 16, 1993.
English language Abstract and Japanese Patent Laid–Open Publication No. 6–60011, Mar. 4, 1994.

*Primary Examiner*—Ayaz R. Sheikh
*Assistant Examiner*—Rupal D. Dharia
*Attorney, Agent, or Firm*—Staas & Halsey

[57] ABSTRACT

A buffer section, a data holding section and a data selector are connected between memories. When multiple bus lines are to be used, for example, the data selector selects those bus lines where desired data is present, after which the data is held in the data holding section and desired timing adjustment is performed by the buffer section to cope with a timing deviation.

10 Claims, 10 Drawing Sheets

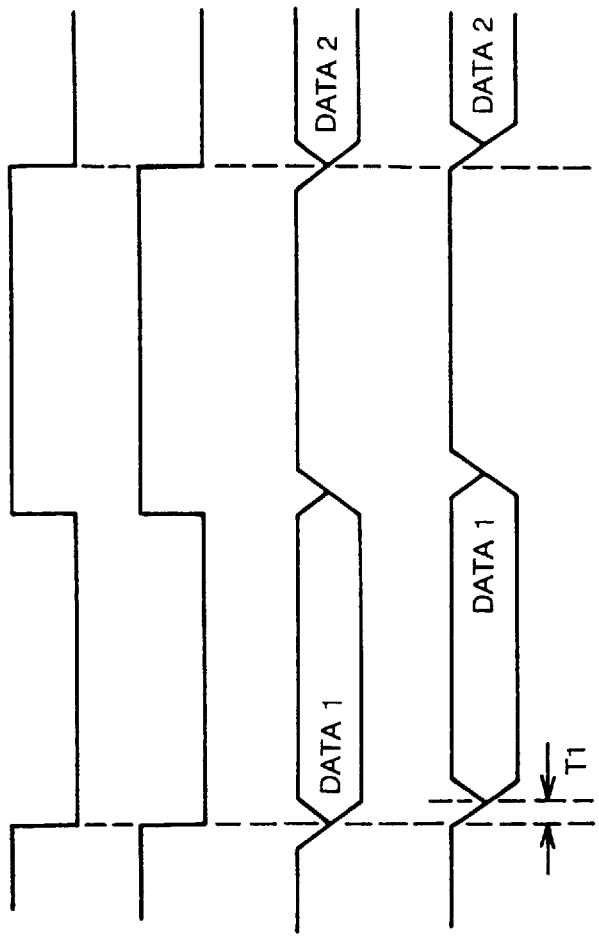

BUS CONTROL APPARATUS FOR DATA TRANSFER SYSTEM

BACKGROUND OF THE INVENTION

1. Field of the Invention

The present invention relates to a bus control apparatus for a data transfer system, and, more particularly, to a bus control apparatus for a data transfer system suitable for data transfer with respect to a card type storage medium like an IC (Integrated Circuit) memory card.

2. Description of the Related Art

IC cards and magnetic cards, for example, are known as card type information storage media.

IC cards are cards in which semiconductor integrated circuits are incorporated. IC cards include an IC memory card (simply called "memory card") incorporating a large-capacity semiconductor memory, a CPU-equipped IC card which incorporates a CPU (Central Processing Unit), constituted of a microprocessor, and a semiconductor memory and has a processing function as well as a memory function, and a multifunction IC card which is such a CPU-equipped IC card additionally equipped with a keyboard and a display function section and is capable of inputting and displaying information by itself.

Example of System Using IC Card

For readers' reference, an example of a system using that kind of IC card.

FIG. 6 shows the structure of one example of an IC card system. The illustrated IC card system is an information processing system, which is designed as an IC card reader/writer and a card issuing system that can use IC cards, constructed using semiconductor technology and super thin mounting technology, at the time this system is adapted to, for example, system control technology and security technology.

A microprocessor 153 and a memory 155 are implemented in an IC card 152 by so-called high-density mounting technology. The microprocessor 153 implemented in this IC card 152 is an 8-bit type, for example, and the memory 155 is a 64-Kbit EEPROM (Electrically Erasable PROM (Programmable Read Only Memory), for example. The IC card 152 exchanges information with external units via contacts provided on, for example, the surface of the IC card 152 under the control of the microprocessor 153 which incorporates a control program 154 as, for example, firmware. In this case, the memory 155 is controlled so that the memory 155 is accessible only when a given sequence of procedures is performed in order to protect data to be stored in the memory 155.

The reader/writer 151 supplies power necessary for the operation of the IC card 152, a control signal such as a clock signal, and data to the IC card 152, and controls data exchange to read data from and write data into the IC card 152. The interface of the contact portion of the IC card 152 with the reader/writer 151 is designed in accordance with, for example, the PCMCIA (personal Computer Memory Card International Association) standards or JEIDA (Japanese Electronics Industry Development Association) standards.

The reader/writer 151 is connected via a standard interface to various terminals 150. This reader/writer 151 may be connected directly to a host system without going through any terminal 150.

A bus control apparatus for controlling bus lines like a data bus is provided at the contact portion of the IC card 152.

One example of a conventional bus control apparatus for an IC card will be described below with reference to FIGS. 1 through 5D.

Example of Bus Control Apparatus Using Pull-up Circuit

In the bus control apparatus shown in FIG. 1, pull-up circuits 100 and 104, buffer circuits 101 and 103 and a bus selector 102 are provided on bus lines connecting a memory A to a memory B.

For easier understanding, the memory A side will be defined as the upstream side and the memory B side as the downstream side in the bus control apparatus in FIG. 1 in the following description.

The pull-up circuit 100 connects a node a of a data bus line to the reference voltage of a reference power supply $V_{cc}$ via a pull-up resistor to prevent the data bus line from being in a so-called floating state.

In this bus control apparatus, the buffer circuit 101 including a tri-state buffer and an inverter is connected to the downstream side of the pull-up circuit 100, and has a control terminal supplied with a buffer control signal C1.

This buffer circuit 101 executes buffering (temporary storage of data and synchronization or timing adjustment) of data which is supplied via the data bus line when the buffer control signal C1 goes to the output suppression state, thereby reducing standby times of a CPU (not shown) even when the CPU processing speeds for controlling reading/writing of the memories A and B, for example, differ from each other and improving the efficiency of, for example, the writing process.

The downstream side of the buffer circuit 101 is connected via the bus selector 102 to the buffer circuit 103.

The pull-up circuit 104, connected to the bus line at a node b, is connected to the further downstream side of the buffer circuit 103. This pull-up circuit 104 connects the reference voltage of the reference power supply $V_{cc}$ to the node b of the data bus line via a pull-up resistor to prevent the bus output terminal from becoming floating.

The memory B is connected to the upstream side of the pull-up circuit 104.

One example of such a bus controller using pull-up circuits is disclosed in Unexamined Japanese Patent Publication No. Sho 63-84316.

This patent publication discloses a pull-up circuit designed to use a high-impedance circuit instead of a pull-up resistor to easily prevent the bus lines from floating even when multiple bus lines are used.

The operation of one example of a bus control apparatus using such a pull-up circuit will be discussed below with reference to timing charts shown in FIGS. 4A through 4D.

FIGS. 4A–4D present timing charts when data is transferred from, for example, the memory A to the memory B via a control section, i.e., via the pull-up circuits 100 and 104, the buffer circuits 101 and 103 and the bus selector 102.

FIG. 4A shows an output enable signal which is given to the memory A from the control section, FIG. 4B shows a write enable signal which is given to the memory B from the control section, FIG. 4C shows the timing of reading data from the memory A and FIG. 4D shows the timing of writing data into the memory B from the pull-up circuit 104 of the control section or from the node b.

When the output enable signal and write enable signal are supplied to the memories A and B from the control section, data is read from the memory A as shown in FIG. 4C.

Data read from the memory A is buffered in the buffer circuit 103 and is written in the memory B when the write enable signal in FIG. 4B for the memory B has an "L" (Low) level. The pull-up circuits 100 and 104 suffer an operational delay due to the increased consumed power when the write enable signal has the "L" level, and writing of data in the memory B has a phase delay T1 (see FIG. 4D) with respect to data reading from the memory A in FIG. 4C.

Example of Bus Controller Using Pull-down Circuit

The bus controller shown in FIG. 2 has pull-down circuits 105 and 106 connected to the bus line in place of the pull-up circuits 100 and 104 in the bus controller in FIG. 1.

The pull-down circuit 105 is connected at the node a between the memory A and the buffer circuit 101, and the pull-down circuit 106 at the node b between the memory B and the buffer circuit 102.

Those pull-down circuits 105 and 106 prevent the bus output from becoming floating even when the buffer circuits 101 and 103 are disabled.

The pull-down circuits 105 and 106 suffer an operational delay due to the increased consumed power when an "H" (High) level signal is output, and writing of data in the memory B has a phase delay with respect to data reading from the memory A.

Example of Bus Controller Using Bus Holding Circuit

FIG. 3 exemplifies a bus controller which uses a bus holding circuit.

The bus controller in FIG. 3 is provided with bus holding circuits 107 and 108 in place of the pull-up circuits 100 and 104 in FIG. 1.

Those bus holding circuits 107 and 107 prevent the bus output from becoming floating even when the buffer circuits 101 and 103 are disabled.

It is apparent that an increase in the consumed current can be suppressed and the device can be prevented from being damaged by stabilizing the potential of the bus output.

The operation of such a bus control apparatus using bus holding circuits will be described below with reference to the timing charts illustrated in FIGS. 5A through 5D.

FIGS. 5A–5D illustrate the timing charts for transferring data from, for example, the memory A to the memory B via a control section, i.e., via the buffer circuits 101 and 103, the bus selector 102 and the bus holding circuits 107 and 108.

FIG. 5A shows an output enable signal which is given to the memory A from the control section, FIG. 5B shows a write enable signal which is given to the memory B from the control section, FIG. 5C shows the timing of reading data from the memory A, and FIG. 5D shows the timing of writing data into the memory B from the bus holding circuit 108 of the control section or from the node b.

Data read from the memory A is buffered in the buffer circuit 103, and the writing to the memory B is initiated when the write enable signal for the memory B in FIG. 5B becomes an "L" level. The bus holding circuits 107 and 108 suffer a delay originated from the operations of the bus holding circuits, and reading of data from the memory A in FIG. 5C is executed at a phase delay T2A, and writing of data into the memory B in FIG. 5D is executed at a phase delay T2B with respect to the output enable signal in FIG. 5A and the write enable signal in FIG. 5B.

An example of a bus controller using such bus holding circuits is disclosed in Unexamined Japanese Patent Publication No. Hei 5-304461.

This patent publication discloses the provision of a bus holding circuit in a high-impedance circuit to easily prevent the bus lines from floating even when multiple bus lines are used and the stabilization of the potential of the bus output to suppress the increase in the consumed current, thus preventing the device from being damaged.

In the bus controller using pull-up circuits or pull-down circuits, however, a large flowthrough current should be allowed to flow across the pull-up resistor or pull-down resistor to prevent the floating state, so that when multiple bus lines are used, particularly, the bus controller should suffer large consumed power.

As mentioned earlier, in those bus controllers, the consumed power increases to delay the operation when an L-level signal is output from the pull-up circuit or when an H-level signal is output from the pull-down circuit.

When those bus controllers are used for IC cards or the like, therefore, not only large consumed power is needed but also the processing speed becomes slower, thus deteriorating the reliability of the apparatus.

When the bus holding circuits are used, the transfer speed becomes slower when the voltage level is changed to an H level from an L level or vice versa.

When this type of bus controller is used for IC cards or the like, therefore, the processing speed becomes slower, thus reducing the reliability and operability of the apparatus.

SUMMARY OF THE INVENTION

Accordingly, it is an object of the present invention to provide a bus control apparatus for a data transfer system, which uses low consumed power and has an increased data transfer speed to improve the reliability and operability of the apparatus and which is suitable particularly for memory cards.

A bus control apparatus for a data transfer system according to this invention comprises:

first and second data input/output sections for inputting/outputting data;

a first data storage having a data holding section and a buffer section, for temporarily storing output data to the first data input/output section, and outputting the output data to the first data input/output section at a predetermined timing in response to a first output control signal;

a second data storage having a data holding section and a buffer section, for temporarily storing output data to the second data input/output section in response to a second output control signal and outputting the output data to the second data input/output section at a predetermined timing; and a transfer control section for supplying the first output control signal for restricting a transfer output to the second data input/output section from the first data input/output section and the second output control signal for restricting a transfer output to the first data input/output section from the second data input/output section, to the first and second data storages to control restriction of data transfer.

The transfer control section may include a selecting section for selectively transferring plural pieces of transfer data between the first data input/output section and the second data input/output section.

A feedback loop to be formed at least at a time of data transfer may be included between the first data storage and the second data storage.

The data holding section of at least one of the first and second data storages may include a flip-flop circuit.

The buffer section of at least one of the first and second data storages may include a tri-state buffer.

The transfer control section may include an information processing section which is controlled by a program to be stored in a memory.

The transfer control section may be de signed to cause the data holding sections of the first and second data storages to hold data before the first and second output control signals restrict outputs to the first and second data input/output sections, and to supply the output control signals to the first and second data storages when data inputs to the first and second data in put/output sections are established.

The transfer control section may be designed to cause the data holding sections of the first and second data storages to hold data at a same time as the first and second output control signals restrict outputs to the first and second data input/output sections, and to supply the output control signals to the first and second data storages at a same time as there are no further data inputs to the first and second data input/output sections.

The transfer control section may be designed to cause the data holding sections of the first and second data storages to hold data at a same time as the first and second output control signals restrict outputs to the first and second data input/output sections, and to supply the output control signals to the first and second data storages when data inputs to the first and second data input/output sections are established.

At least one of the first and second data input/output sections may be connected to an IC card including a memory.

At least one of the data holding section may include a function of a pipeline buffer for transferring data.

In the bus control apparatus for a data transfer system according to this invention, the first data storage having the data holding section and buffer section temporarily stores output data to the first data input/output section, and outputs the output data to the first data input/output section at a predetermined timing in response to a first output control signal, the second data storage having the data holding section and buffer section temporarily stores output data to the second data input/output section in response to a second output control signal and outputting the output data to the second data input/output section at a predetermined timing, and the transfer control section supplies the first output control signal for restricting a transfer output to the second data input/output section from the first data input/output section and the second output control signal for restricting a transfer output to the first data input/output section from the second data input/output section, to the first and second data storages to control the restriction of data transfer. Accordingly, the consumed power is reduced and the data transfer speed between memories is increased, thereby improving the reliability and operability of the apparatus.

BRIEF DESCRIPTION OF THE DRAWINGS

Other objects and advantages of the invention will become apparent during the following discussion in conjunction with the accompanying drawings, in which:

FIGS. 4A through 4D are timing charts for the bus control apparatus in FIG. 1;

DETAILED DESCRIPTION OF THE PREFERRED EMBODIMENTS

Bus control apparatuses for a data transfer system according to preferred embodiments of the present invention will now be described with reference to the accompanying drawings.

First Embodiment

A bus control apparatus according to the first embodiment of this invention will now be described with reference to FIGS. 7, 8 and 9A through 9F.

Figure 1:
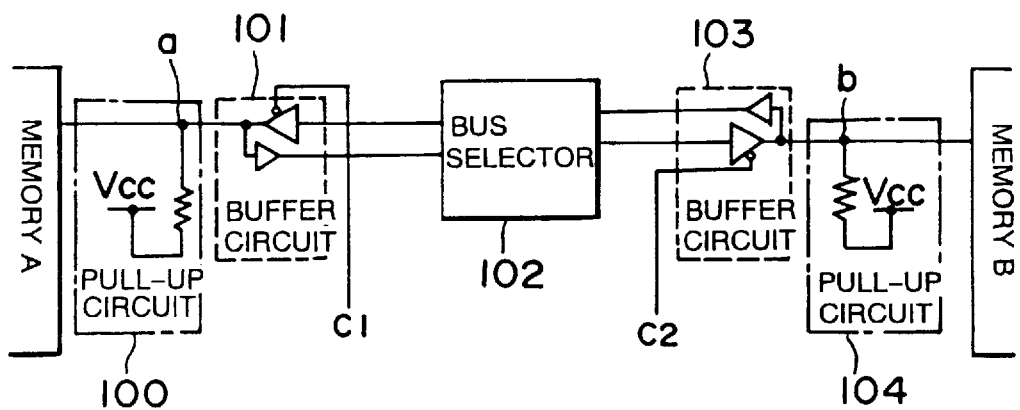
FIG. 1 is a circuit diagram exemplifying a conventional bus control apparatus.
Figure 2:
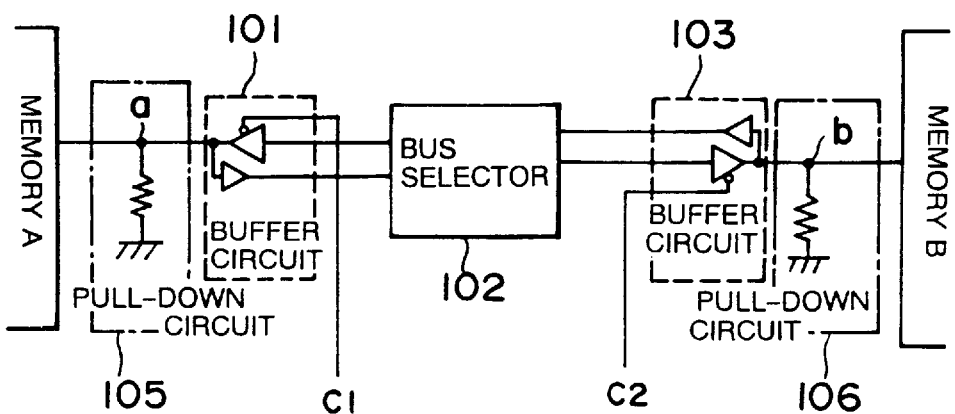
FIG. 2 is a circuit diagram showing another example of the conventional bus control apparatus.
Figure 3:
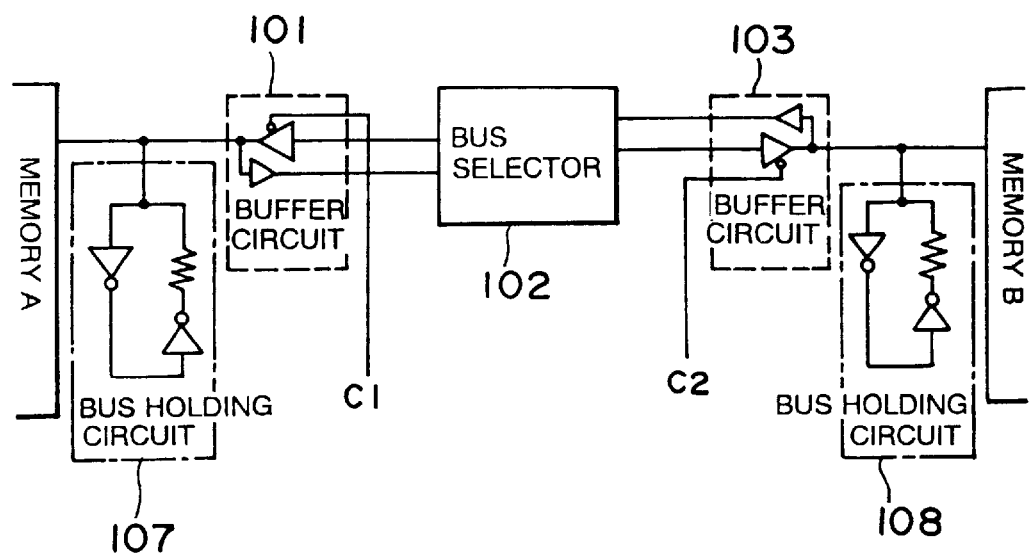
FIG. 3 is a circuit diagram showing a further example of the conventional bus control apparatus.
Figures 5A, 5B, 5C, 5D:
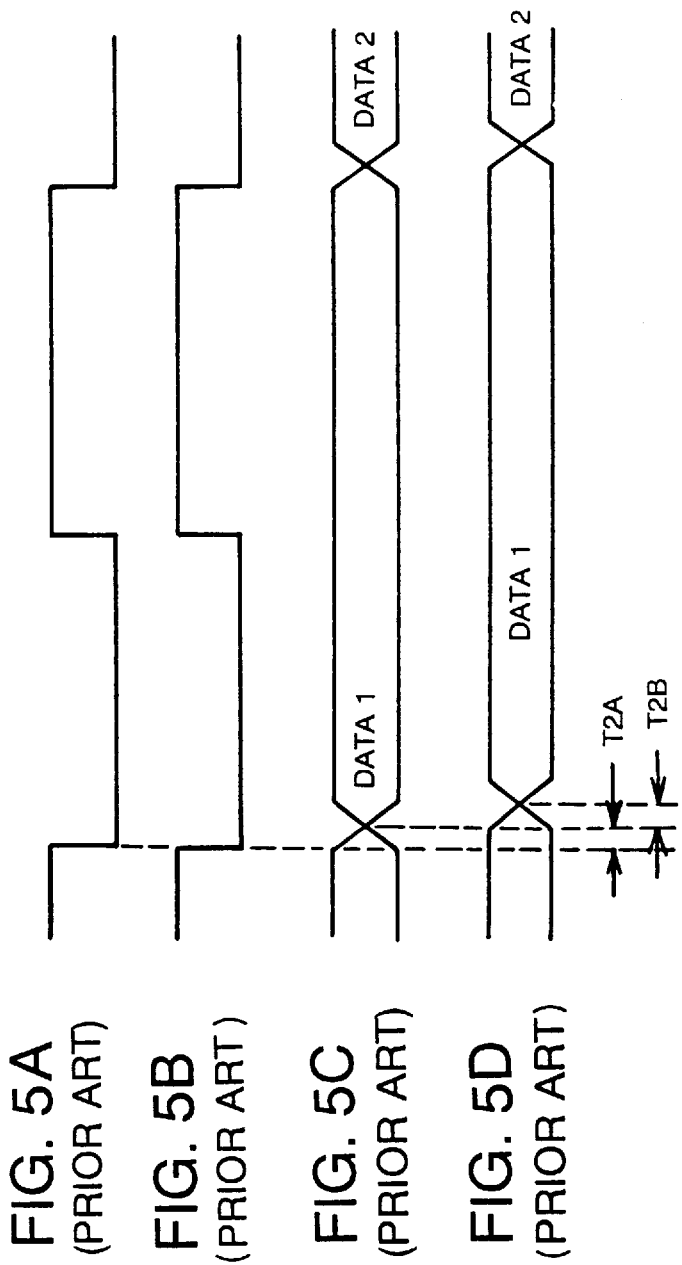
FIGS. 5A through 5D are timing charts for the bus control apparatus in FIG. 3.
Figure 6:
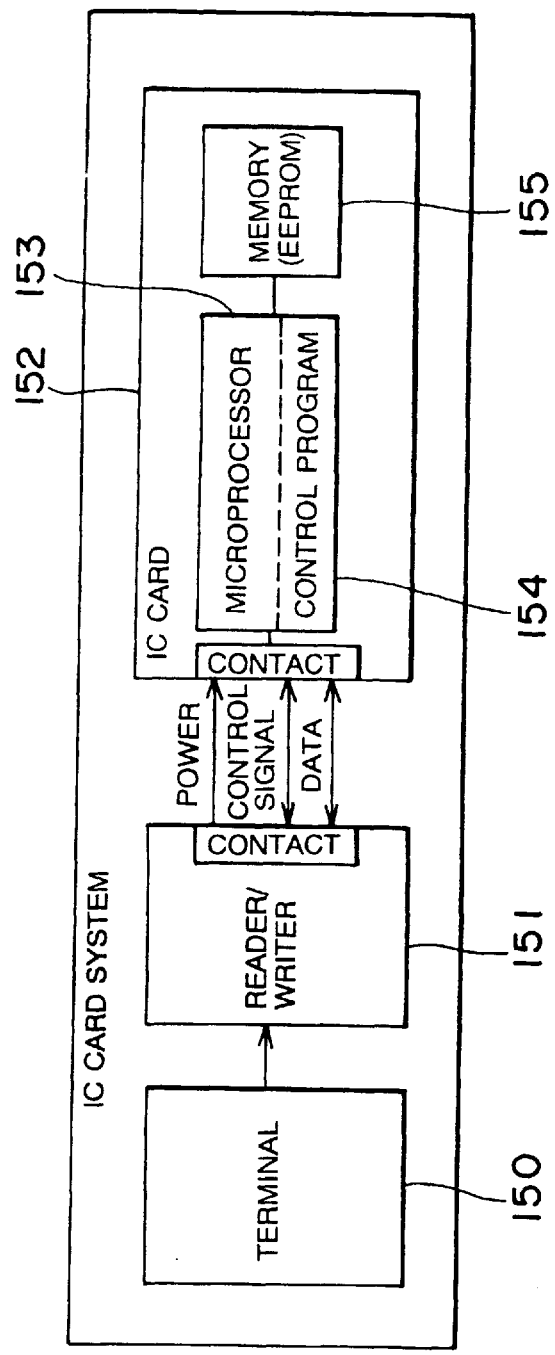
FIG. 6 is a block diagram showing the structure of a conventional IC card system.
Figure 7:
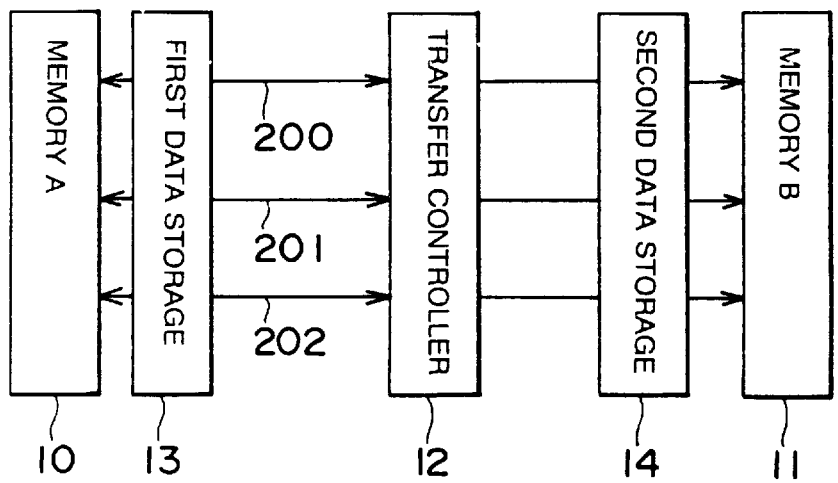
FIG. 7 is a block diagram showing the structure of a bus control apparatus according to the first embodiment of this invention.

FIG. 7 shows the structure of a bus control apparatus provided between memories. FIG. 7 shows a first memory (memory A) 10, a second memory (memory B) 11, a transfer controller 12, and first and second data storages 13 and 14.

The bus control apparatus in FIG. 7 is constituted by connecting the transfer controller 12 including a data selector and the first and second data storages 13 and 14 each including buffer sections and data holding sections to the bus lines between the first memory 10 and the second memory 11. The first and second data storages 13 and 14 are coupled to first and second memory 10 and 11 through data input/output sections (not shown), such as connection interfaces, respectively.

A data bus between the first memory 10 and the second memory 11 consists of data bus lines 200 and signal lines 201 and 202.

The memories 10 and 11 may be random access memories (RAMs), electrically erasable programmable read only memories (EEPROMs) or flash EEPROMs.

According to this bus control apparatus, even when multiple bus lines are to be used, the potential of the bus output is held by the data holding sections of the data storages 13 and 14, which may be constituted of flip-flop circuits. This suppresses an increase in the consumed current, thus preventing the device from being damaged and speeding up the bus transfer time.

Figure 8:
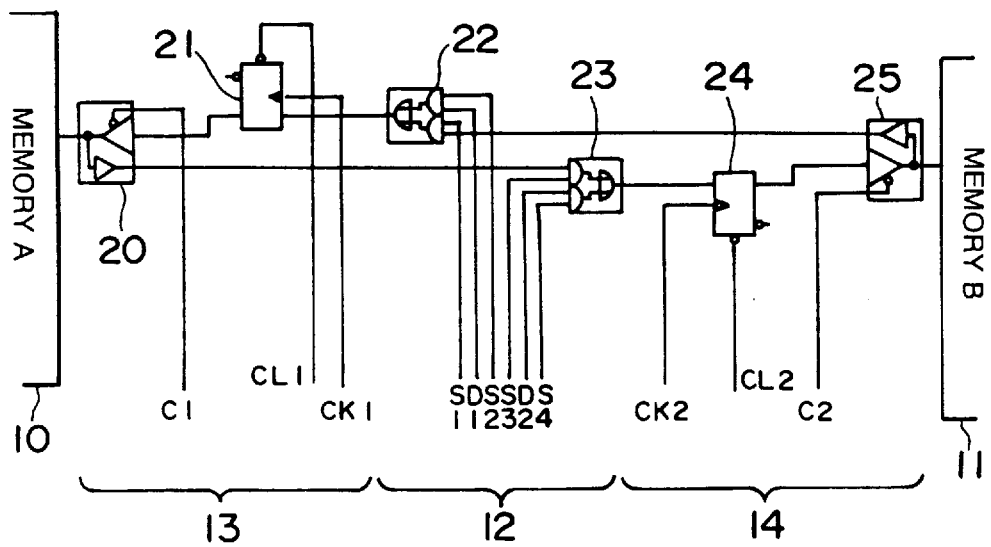
FIG. 8 is a circuit diagram showing the detailed structure of the bus control apparatus in FIG. 7.

FIG. 8 shows the specific circuit structure of the bus control apparatus in FIG. 7.

For easier understanding, FIG. 8 shows only a single bus line for data transfer to the memory 11 from the memory 10 and only a single bus line for data transfer to the memory 10 from the memory 11 as bus lines, and the memory 10 side will be defined as the upstream side and the memory 11 side will be defined as the downstream side in the following description.

The bus control apparatus shown in FIG. 8 has a first buffer section 20, a first data holding section 21, a first data selector 22, a second data selector 23, a second data holding section 24 and a second buffer section 25.

The first buffer section 20 and the first data holding section 21 constitute the first data storage 13, the first data selector 22 and the second data selector 23 constitute the transfer controller 12, and the second data holding section 24 and the second buffer section 25 constitute the second data storage 14.

In the data storage 13, the buffer section 20 is provided downstream of the memory 10 and the data holding section 21 is provided downstream of this buffer section 20.

In the transfer controller 12, the data selector 22 for selecting from which data bus line data should be obtained is provided downstream of the data holding section 21.

In the data storage 14, the buffer section 25 is provided upstream of the memory 11 and the data holding section 24 is provided upstream of this buffer section 25.

In the transfer controller 12, the data selector 23 for selecting from which data bus line data should be obtained is provided upstream of the data holding section 24.

The buffer sections 20 and 25 are comprised of so-called tri-state buffers, inverters, etc., and the data holding sections 21 and 24 are constituted by latch circuits which use so-called level latches (D flip-flops or D-latches) and edge latch (edge trigger type flip-flops) or the like.

The data selectors 22 and 23 are constituted by multiplexers which provide selective connection by combinations of gates, for example.

A CPU, though not shown, is provided to control the transfer controller 12 and the data storages 13 and 14.

In the bus control apparatus shown in FIGS. 7 and 8, the buffer sections 20 and 25, the data holding sections 21 and 24, and the data selectors 22 and 23 are connected to the bus lines between the memories 10 and 11. When multiple bus lines are to be used, for example, the data selectors 22 and 23 select those bus lines where desired data is present, after which the data is held in the data holding sections 21 and 24 and desired timing adjustment is performed by the buffer sections 20 and 25 to cope with a timing deviation.

The operation of the bus control apparatus in FIGS. 7 and 8 will now be described with reference to the timing charts in FIGS. 9A through 9F.

Figure 9:
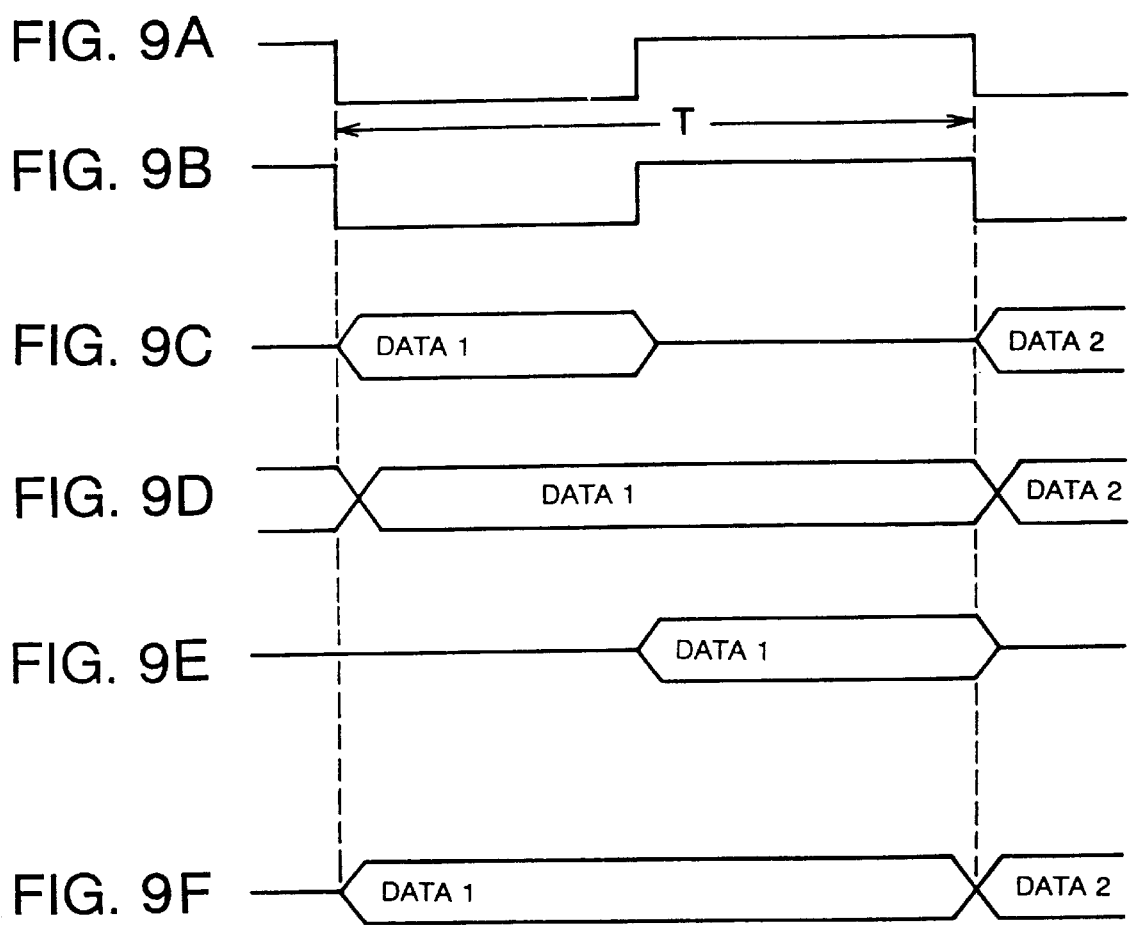
FIGS. 9A through 9F are timing charts for explaining the operation of the bus control apparatus shown in FIGS. 7 and 8.

FIG. 9A shows an output enable signal for the memory 10, FIG. 9B shows a write enable signal for the memory 11, FIG. 9C shows data reading from the memory 10, FIG. 9D shows data on the portion including the transfer controller 12 (the data selectors 22 and 23) and the data holding sections 21 and 24, FIG. 9E shows data writing in the memory 11, and FIG. 9F shows data on the bus lines in the entire bus control apparatus.

Data 1 is read from the memory 10 as shown in FIG. 9C by the output enable signal in FIG. 9A.

The data 1 read from the memory 10 and selected by the data selector 23 is supplied via the data holding section 24 to the buffer section 25 and is written in the memory 11 from the buffer section 25 as shown in FIG. 9D.

The output data from the data holding section 24 is output as shown in FIG. 9D in a period corresponding to one cycle from the first (odd-numbered) falling of the output enable (OE) pulse shown in FIG. 9A to the next falling of the output enable (OE) pulse.

While the data 1 shown in FIG. 9D is being output, the data 1 is transferred to the memory 11 from the buffer section 25 as shown in FIG. 9E.

That is, while the data 1 selected by the data selector 23 is being output from the buffer section 25 via the data holding section 24, the data 1 shown in FIG. 9E is input to the memory 11.

At this time, the data 1 transferred via the data bus lines 200 (see FIG. 7) as shown in FIG. 9F in the period of time during which the data 1 shown in FIG. 9C read from the memory 10 and the data 1 shown in FIG. 9E output from the buffer section 25 are combined, i.e., during the period of time from the first (odd-numbered) output of the read pulse to the next output of the read pulse.

In the above case, data is transferred from the memory 10 to the memory 11 in the route from the buffer section 20, to the data selector 23, (to the bus lines 200), to the data holding section 24 and to the buffer section 25. Likewise, data is transferred from the memory 11 to the memory 10 in the route from the buffer section 25, to the data selector 22, (to the bus lines 200), to the data holding section 21 and to the buffer section 20.

In the first control mode, the bus control apparatus in FIG. 8 performs such control that the data holding section 21 holds data before an output control signal C2 for controlling the data output of the buffer section 25 restricts the output to the memory 11, and an output control signal C1 for controlling the data output from the buffer section 20 is so set as to enable the data output to the memory 10 at the same time as there is no further data input from the memory 10.

In the second control mode, the bus control apparatus performs such control that the data holding section 21 holds data before the output control signal C2 for controlling the data output of the buffer section 25 restricts the output to the memory 11, and the output control signal C1 for controlling the data output from the buffer section 20 is so set as to enable the data output to the memory 10 when a data input from the memory 10 is established.

In the third control mode, the bus control apparatus performs such control that the data holding section 21 holds data at the same time as the output control signal C2 for controlling the data output of the buffer section 25 restricts the output to the memory 11, and the output control signal C1 for controlling the data output from the buffer section 20 is so set as to enable the data output to the memory 10 at the same time as there is no further data input from the memory 10.

In the fourth control mode, the bus control apparatus performs such control that the data holding section 21 holds data at the same time as the output control signal C2 for controlling the data output of the buffer section 25 restricts the output to the memory 11, and the output control signal C1 for controlling the data output from the buffer section 20 is so set as to enable the data output to the memory 10 when a data input from the memory 10 is established.

In FIG. 8, the data holding sections 21 and 24 function when respectively receiving clocks CK1 and CK2 and latch pulses CL1 and CL2. The data selectors 22 and 23 selectively output data D1 and D2 and data from the buffer sections 21 and 25 in accordance with control signals S1 to S4.

When multiple bus lines 200 are used, the data selected by the data selectors 22 and 23 are held by the data holding sections 21 and 24, so that the potential of the bus output can be stabilized, thus preventing the floating state.

An increase in the consumed current can be suppressed in this manner, thus preventing the device from being damaged.

In the bus control apparatus shown in FIGS. 7 and 8, in the case where data are simultaneously output from the memories 10 and 11, if the data are output at the same edge timing, the data are simultaneously held in the data holding sections 21 and 24, thus reducing the time needed for data holding. This improves the transfer efficiency by the data bus, and shortens the data transfer time as a consequence.

At the time data is transferred between the memories 10 and 11, a feedback loop from the data holding sections 21 and 24 to the buffer sections 20 and 25 is formed and data is held by this feedback loop, so that the potential of the bus output can be stabilized.

At least one of the data holding sections 21 and 24 may also be used to operate as a pipeline buffer for transferring data between memories.

The constituting components of the bus control apparatus are not limited to the aforementioned hardware structure, but at least a part of the same function may be accomplished by the function of the CPU according to a program previously stored in the memory.

This modification can contribute to providing, for example, a memory card which is prevented from causing a functional failure due to a chronological change as much as possible and thus has an improved reliability.

Second Embodiment

A bus control apparatus according to the second embodiment of this invention will now be discussed with reference to FIG. 10 and FIGS. 9A through 9F.

Figure 10:
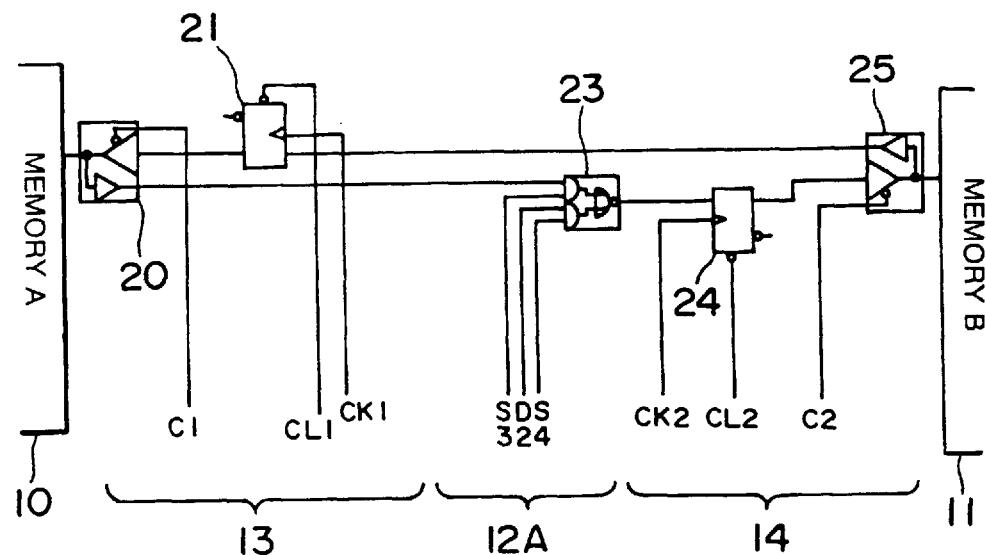
FIG. 10 is a block diagram showing the structure of a bus control apparatus according to the second embodiment of this invention.

The bus control apparatus shown in FIG. 10 has the structure shown in FIG. 8 from which, however, the first data selector 22 is omitted.

In this bus control apparatus, data transfer from the memory 10 to the memory 11 is executed based on the data selected by the data selector 23.

The bus control apparatus shown in FIG. 10, which presents a detailed circuit diagram corresponding to FIG. 8, has a first buffer section 20, a first data holding section 21, a data selector 23, a second data holding section 24 and a second buffer section 25.

Like those components in FIG. 8, the first buffer section 20 and the first data holding section 21 constitute the first data storage 13, and the second data holding section 24 and the second buffer section 25 constitute the second data storage 14. In this case, the data selector 23 alone constitutes a transfer controller 12A.

In the data storage 13, the buffer section 20 is provided downstream of the memory 10 and the data holding section 21 is provided downstream of this buffer section 20.

In the data storage 14, the buffer section 25 is provided upstream of the memory 11 and the data holding section 21 is provided upstream of this buffer section 25.

In the transfer controller 12A, the data selector 23 for selecting from which data bus line data should be obtained is provided upstream of the data holding section 24.

In the bus control apparatus shown in FIG. 10, the buffer sections 20 and 25, the data holding sections 21 and 24, and the data selector 23 are connected to the bus lines between the memories 10 and 11. When multiple bus lines are to be used, for example, the data selector 23 selects those bus lines where desired data is present, after which the data is held in the data holding sections 21 and 24 and desired timing adjustment is performed by the buffer sections 20 and 25 to cope with a timing deviation.

The operation of the bus control apparatus in FIG. 10 will now be described with reference to the timing charts in FIGS. 9A through 9F.

FIG. 9A shows an output enable signal for the memory 10, FIG. 9B shows a write enable signal for the memory 11, FIG. 9C shows data reading from the memory 10, FIG. 9D shows data on the portion including the data transfer controller 12A and the data holding sections 21 and 24, FIG. 9E shows data writing in the memory 11, and FIG. 9F shows data on the bus lines in the entire bus control apparatus.

Data 1 is read from the memory 10 as shown in FIG. 9C by the output enable signal in FIG. 9A.

The data 1 read from the memory 10 and selected by the data selector 23 is supplied via the data holding section 24 to the buffer section 25 and is written in the memory 11 from the buffer section 25 as shown in FIG. 9D.

The output data from the data holding section 24 is output as shown in FIG. 9D in a period corresponding to one cycle from the first (odd-numbered) falling of the output enable (OE) pulse shown in FIG. 9A to the next falling of the output enable (OE) pulse.

While the data 1 shown in FIG. 9D is being output, the data 1 is transferred to the memory 11 from the buffer section 25 as shown in FIG. 9E.

That is, while the data 1 selected by the data selector 23 is being output from the buffer section 25 via the data holding section 24, the data 1 shown in FIG. 9E is input to the memory 11.

At this time, the data 1 transferred via the data bus lines as shown in FIG. 9F in the period of time during which the data 1 shown in FIG. 9C read from the memory 10 and the data 1 shown in FIG. 9E output from the buffer section 25 are combined, i.e., during the period of time from the first (odd-numbered) output of the read pulse to the next output of the read pulse.

In the above case, data is transferred from the memory 10 to the memory 11 in the route from the buffer section 20, to the data selector 23, (to the bus lines 200), to the data holding section 24 and to the buffer section 25.

When multiple bus lines 200 are used, the data selected by the data selector 23 is held by the data holding sections 21 and 24, so that the potential of the bus output can be stabilized, thus preventing the floating state.

An increase in the consumed current can be suppressed in this manner, thus preventing the device from being damaged.

Third Embodiment

A bus control apparatus according to the third embodiment of this invention will now be discussed with reference to FIG. 11 and FIGS. 9A through 9F.

Figure 11:
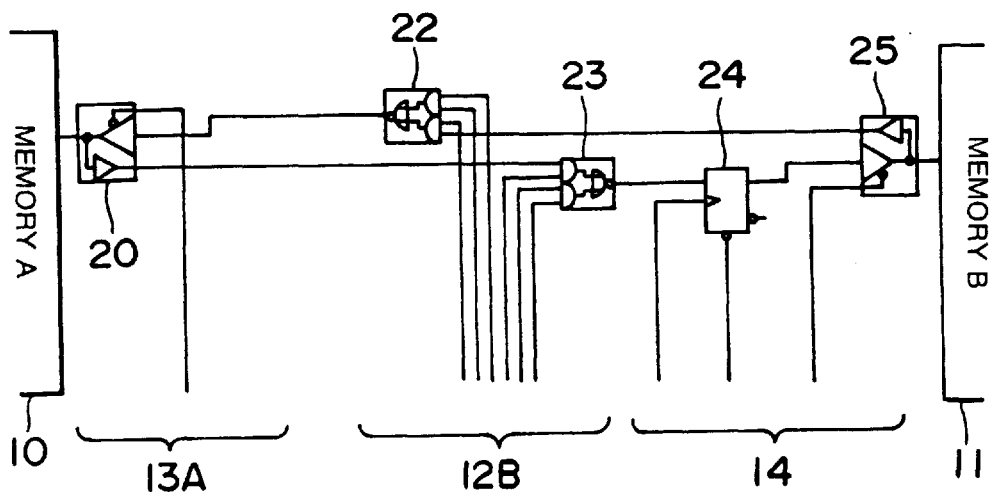
FIG. 11 is a block diagram showing the structure of a bus control apparatus according to the third embodiment of this invention.

The bus control apparatus shown in FIG. 11 has the same structure as shown in FIG. 8 except that the first data holding section 21 is omitted.

In this bus control apparatus, data transfer between the memory 10 and the memory 11 is executed based on the data selected by the first and second data selectors 22 and 23.

The bus control apparatus shown in FIG. 11 has a first buffer section 20, a first data selector 22, a second data selector 23, a data holding section 24 and a second buffer section 25.

The first data selector 22 and the second data selector 23 constitute the transfer controller 12, and the data holding section 24 and the second buffer section 25 constitute the second data storage 14. In this case, the first buffer section 20 alone constitutes the first data storage 13A.

In the data storage 13A, the buffer section 20 is provided downstream of the memory 10.

In the transfer controller 12, the data selector 22 for selecting from which data bus line data should be obtained is provided downstream of the buffer section 20.

In the data storage 14, the buffer section 25 is provided upstream of the memory 11 and the data holding section 24 is provided upstream of this buffer section 25.

In the transfer controller 12, the data selector 23 for selecting from which data bus line data should be obtained is provided upstream of the data holding section 24.

In the bus control apparatus shown in FIG. 11, the buffer sections 20 and 25, the data holding section 24, and the data selectors 22 and 23 are connected to the bus lines between the memories 10 and 11. When multiple bus lines are to be used, for example, the data selectors 22 and 23 select those bus lines where desired data is present, after which the data is held in the data holding section 24 and desired timing adjustment is performed by the buffer sections 20 and 25 to cope with a timing deviation.

The operation of the bus control apparatus in FIG. 11 will now be described with reference to the timing charts in FIGS. 9A through 9F.

FIG. 9A shows an output enable signal for the memory 10, FIG. 9B shows a write enable signal for the memory 11, FIG. 9C shows data reading from the memory 10, FIG. 9D shows data on the portion including the transfer controller 12 and the data holding section 24, FIG. 9E shows data writing in the memory 11, and FIG. 9F shows data on the bus lines in the entire bus control apparatus.

Data 1 is read from the memory 10 as shown in FIG. 9C by the output enable signal in FIG. 9A.

The data 1 read from the memory 10 and selected by the data selector 23 is supplied via the data holding section 24 to the buffer section 25 and is written in the memory 11 from the buffer section 25 as shown in FIG. 9D.

The output data from the data holding section 24 is output as shown in FIG. 9D in a period corresponding to one cycle from the first (odd-numbered) falling of the output enable (OE) pulse shown in FIG. 9A to the next falling of the output enable (OE) pulse.

While the data 1 shown in FIG. 9D is being output, the data 1 is transferred to the memory 11 from the buffer section 25 as shown in FIG. 9E.

That is, while the data 1 selected by the data selector 23 is being output from the buffer section 25 via the data holding section 24, the data 1 shown in FIG. 9E is input to the memory 11.

At this time, the data 1 transferred via the data bus lines as shown in FIG. 9F in the period of time during which the data 1 shown in FIG. 9C read from the memory 10 and the data 1 shown in FIG. 9E output from the buffer section 25 are combined, i.e., during the period of time from the first (odd-numbered) output of the read pulse to the next output of the read pulse.

In the above case, data is transferred from the memory 10 to the memory 11 in the route from the buffer section 20, to the data selector 23, (to the bus lines 200), to the data holding section 24 and to the buffer section 25. Likewise, data is transferred from the memory 11 to the memory 10 in the route from the buffer section 25, to the data selector 22, (to the bus lines 200), to the buffer section 20.

When multiple bus lines 200 are used, the data selected by the data selectors 22 and 23 are held by the data holding sections 21 and 24, so that the potential of the bus output can be stabilized, thus preventing the floating state.

An increase in the consumed current can be suppressed in this manner, thus preventing the device from being damaged.

Fourth Embodiment

A bus control apparatus according to the fourth embodiment of this invention will now be discussed with reference to FIG. 12.

Figure 12:
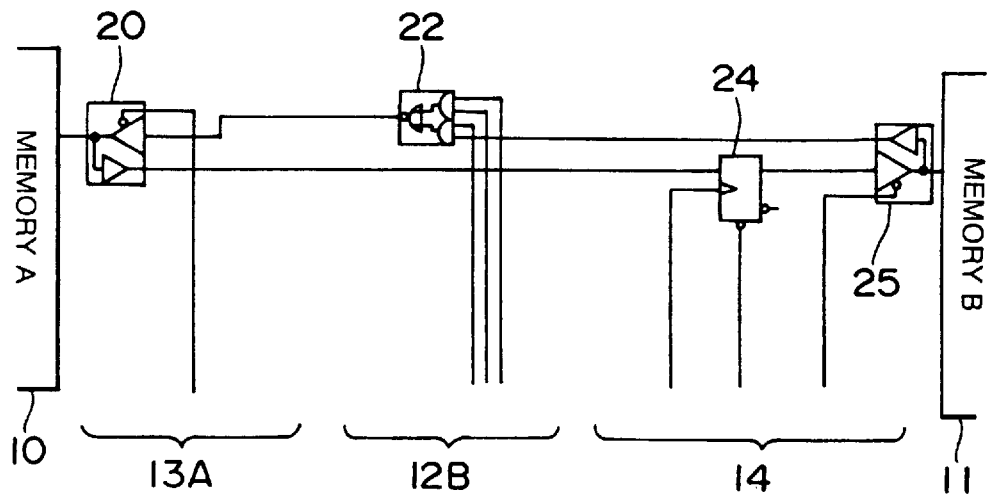
FIG. 12 is a block diagram showing the structure of a bus control apparatus according to the fourth embodiment of this invention.

The bus control apparatus shown in FIG. 12 has the structure shown in FIG. 11 from which, however, the second data selector 23 is omitted.

In this bus control apparatus, data transfer from the memory 11 to the memory 10 is executed based on the data selected by the data selector 22.

The bus control apparatus shown in FIG. 12 has a first buffer section 20, a data selector 22, a data holding section 24 and a second buffer section 25.

The first buffer section 20 constitutes the first data storage 13A, and the data holding section 24 and the second buffer section 25 constitute the second data storage 14. In this case, the data selector 22 alone constitutes a transfer controller 12B.

In the data storage 13A, the buffer section 20 is provided downstream of the memory 10.

In the transfer controller 12B, the data selector 22 for selecting from which data bus line data should be obtained is provided downstream of the buffer section 20.

In the data storage 14, the buffer section 25 is provided upstream of the memory 11 and the data holding section 24 is provided upstream of this buffer section 25.

In the bus control apparatus shown in FIG. 12, the buffer sections 20 and 25, the data holding section 24, and the data selector 22 are connected to the bus lines between the memories 10 and 11. When multiple bus lines are to be used, for example, the data selector 22 selects those bus lines where desired data is present, after which the data is held in the data holding section 24 and desired timing adjustment is performed by the buffer sections 20 and 25 to cope with a timing deviation.

When multiple bus lines 200 are used, the data selected by the data selector 22 is held by the data holding section 24, so that the potential of the bus output can be stabilized, thus preventing the floating state.

An increase in the consumed current can be suppressed in this manner, thus preventing the device from being damaged.

Fifth Embodiment

A bus control apparatus according to the fifth embodiment of this invention will now be discussed with reference to FIG. 13.

Figure 13:
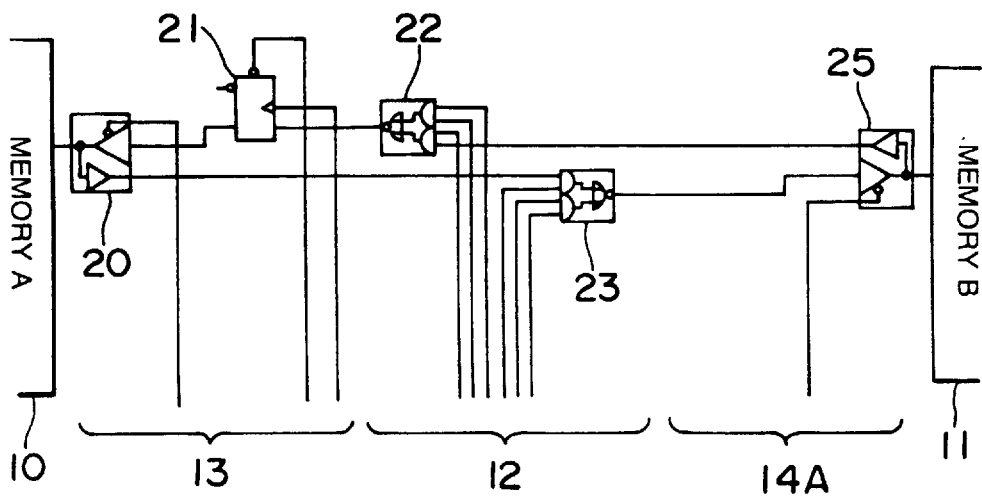
FIG. 13 is a block diagram showing the structure of a bus control apparatus according to the fifth embodiment of this invention.

The bus control apparatus shown in FIG. 13 has the same structure as shown in FIG. 8 except that the second data holding section 24 is omitted.

In this bus control apparatus, data transfer between the memory 10 and the memory 11 is executed based on the data selected by the data selectors 22 and 23.

The bus control apparatus shown in FIG. 13 has a first buffer section 20, a data holding section 21, a first data selector 22, a second data selector 23, and a second buffer section 25.

The first buffer section 20 and the data holding section 21 constitute the first data storage 13, and the first data selector 22 and the second data selector 23 constitute the transfer controller 12. In this case, the second buffer section 25 alone constitutes the second data storage 14A.

In the data storage 13, the buffer section 20 is provided downstream of the memory 10 and the data holding section 21 is provided downstream of this buffer section 20.

In the transfer controller 12, the data selector 22 for selecting from which data bus line data should be obtained is provided downstream of the data holding section 21.

In the data storage 14A, the buffer section 25 is provided upstream of the memory 11.

In the transfer controller 12, the data selector 23 for selecting from which data bus line data should be obtained is provided upstream of the buffer section 25.

In the bus control apparatus shown in FIG. 13, the buffer sections 20 and 25, the data holding section 21, and the data selectors 22 and 23 are connected to the bus lines between the memories 10 and 11. When multiple bus lines are to be used, for example, the data selectors 22 and 23 select those bus lines where desired data is present, after which the data is held in the data holding section 21 and desired timing adjustment is performed by the buffer sections 20 and 25 to cope with a timing deviation.

Sixth Embodiment

A bus control apparatus according to the sixth embodiment of this invention will now be discussed with reference to FIG. 14.

Figure 14:
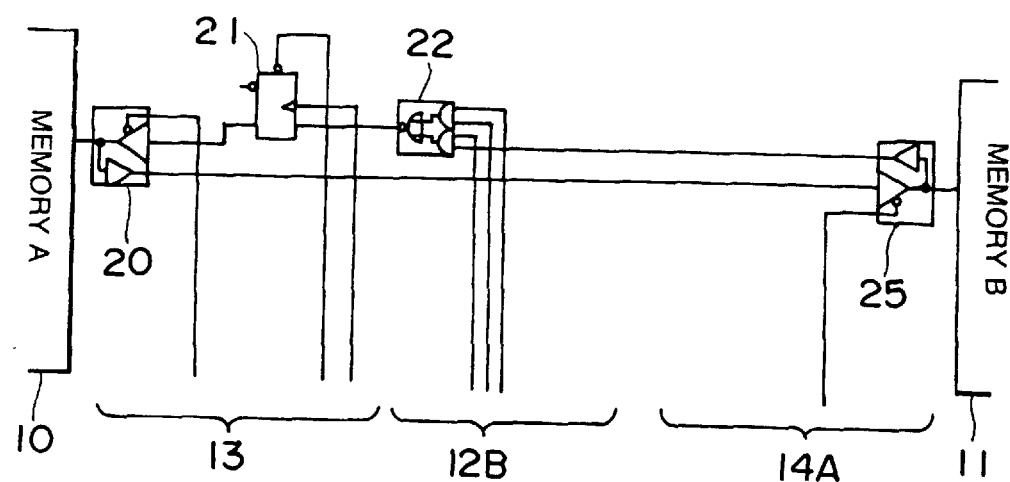
FIG. 14 is a block diagram showing the structure of a bus control apparatus according to the sixth embodiment of this invention.

The bus control apparatus shown in FIG. 14 has the structure shown in FIG. 13 from which, however, the second data selector 23 is omitted.

In this bus control apparatus, data transfer from the memory 11 to the memory 10 is executed based on the data selected by the data selector 22.

The bus control apparatus shown in FIG. 14 has a first buffer section 20, a data holding section 21, a data selector 22, and a second buffer section 25.

The first buffer section 20 and the data holding section 21 constitute the first data storage 13, and the second buffer section 25 constitutes the second data storage 14A. In this case, the data selector 22 constitutes the same transfer controller 12B as shown in FIG. 12.

In the data storage 13, the buffer section 20 is provided downstream of the memory 10 and the data holding section 21 is provided downstream of this buffer section 20.

In the transfer controller 12B, the data selector 22 for selecting from which data bus line data should be obtained is provided downstream of the data holding section 21.

In the data storage 14A, the buffer section 25 is provided upstream of the memory 11.

In the bus control apparatus shown in FIG. 14, the buffer sections 20 and 25, the data holding section 21, and the data selector 22 are connected to the bus lines between the memories 10 and 11. When multiple bus lines are to be used, for example, the data selector 22 selects those bus lines where desired data is present, after which the data is held in the data holding section 21 and desired timing adjustment is performed by the buffer sections 20 and 25 to cope with a timing deviation.

Seventh Embodiment

A bus control apparatus according to the seventh embodiment of this invention will now be discussed with reference to FIG. 15.

Figure 15:
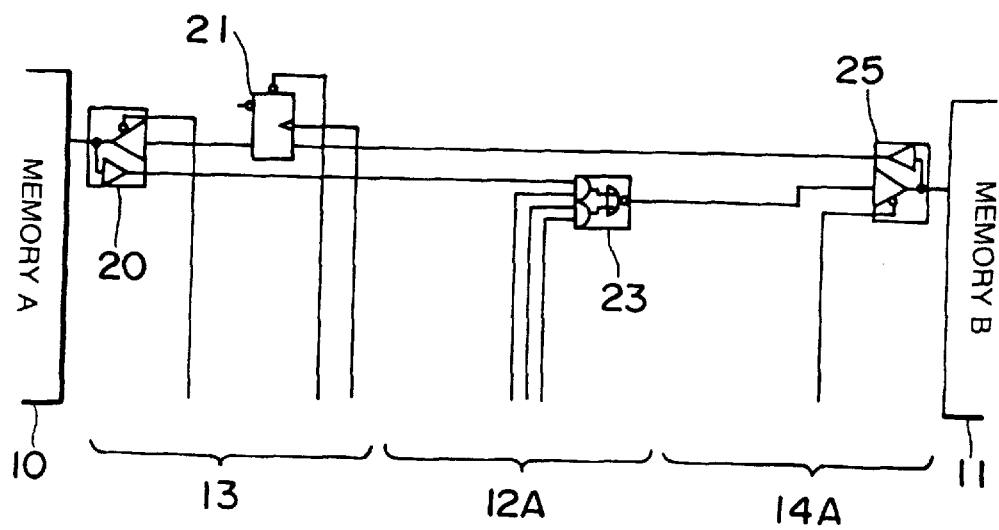
FIG. 15 is a block diagram showing the structure of a bus control apparatus according to the seventh embodiment of this invention.

The bus control apparatus shown in FIG. 15 has the same structure as shown in FIG. 13 except that the first data selector 22 is omitted.

In this bus control apparatus, data transfer from the memory 10 to the memory 11 is executed based on the data selected by the data selector 23.

The bus control apparatus shown in FIG. 15 has a first buffer section 20, a data holding section 21, a data selector 23, and a second buffer section 25.

The first buffer section 20 and the data holding section 21 constitute the first data storage 13, and the second buffer section 25 constitutes the second data storage 14A. In this case, the data selector 23 alone constitutes the transfer controller 12A as in the structure shown in FIG. 13.

In the data storage 13, the buffer section 20 is provided downstream of the memory 10 and the data holding section 21 is provided downstream of this buffer section 20.

In the data storage 14A, the buffer section 25 is provided upstream of the memory 11.

In the transfer controller 12A, the data selector 23 for selecting from which data bus line data should be obtained is provided upstream of the buffer section 25.

In the bus control apparatus shown in FIG. 15, the buffer sections 20 and 25, the data holding section 21, and the data selector 23 are connected to the bus lines between the memories 10 and 11. When multiple bus lines are to be used, for example, the data selector 23 select those bus lines where desired data is present, after which the data is held in the data holding section 21 and desired timing adjustment is performed by the buffer sections 20 and 25 to cope with a timing deviation.

It is apparent that, in this invention, a wide range of different working modes can be formed based on the invention without deviating from the spirit and scope of the invention.

What is claimed is:

1. A bus control apparatus for a data transfer system comprising:

a first data input/output circuit into which data is inputted and from which data is outputted;

a second data input/output circuit into which data is inputted and from which data is outputted;

a first storage circuit having a first data holding circuit which temporarily stores data to be inputted into said first input/output circuit and a first buffer which outputs the temporarily stored data to said first input/output circuit in response to a first output control signal, said first data holding circuit being connected to an input terminal of said first buffer;

a second storage circuit having a second data holding circuit which temporarily stores data to be inputted into said second input/output circuit and a second buffer which outputs the temporarily stored data to said second input/output circuit in response to a second output control signal, said second data holding circuit being connected to an input terminal of said second buffer; and a transfer control circuit which supplies the first output control signal at a predetermined timing so as to control a transfer of data outputted from said second input/output circuit to said first input/output circuit, and said transfer control circuit supplies the second output control signal at a predetermined timing so as to control a transfer of data outputted from said first input/output circuit to said second input/output circuit, wherein said transfer control circuits includes means for causing said first and second data holding circuits to hold data when said first and second output control signals restrict outputs to said first and second data input/output circuits, and for supplying said first and second output control signals to said first and second storage circuits when no further data is being input to said first and second data input/output circuits.

2. A bus control apparatus for a data transfer system comprising:

a first data input/output circuit into which data is inputted and from which data is outputted:

a second data input/output circuit into which data is inputted and from which data is outputted;

a first storage circuit having a first data holding circuit which temporarily stores data to be inputted into said first input/output circuit and a first buffer which outputs the temporarily stored data to said first input/output circuit in response to a first output control signal, said first data holding circuit being connected to an input terminal of said first buffer;

a second storage circuit having a second data holding circuit which temporarily stores data to be inputted into said second input/output circuit and a second buffer which outputs the temporarily stored data to said second input/output circuit in response to a second output control signal, said second data holding circuit being connected to an input terminal of said second buffer;and a transfer control circuit which supplies the first output control signal at a predetermined timing so as to control a transfer of data outputted from said second input/output circuit to said first input/output circuit, and said transfer control circuit supplies the second output control signal at a predetermined timing so as to control a transfer of data outputted from said first input/output circuit to said second input/output circuit, wherein said transfer control circuit includes means for causing said first and second data holding circuits to hold data when said first and second output control signals restrict outputs to said first and second data input/output circuits, and for supplying said first and second output control signals to said first and second storage circuits when data inputs to said first and second data input/output circuits are established.

3. A bus control apparatus for a data transfer system comprising:

a first data input/output circuit into which data is inputted and from which data is outputted;

a second data input/output circuit into which data is inputted and from which data is outputted;

a first storage circuit having a first data holding circuit which temporarily stores data to be inputted into said first input/output circuit and a first buffer which outputs the temporarily stored data to said first input/output circuit in response to a first output control signal, said first data holding circuit being connected to an input terminal of said first buffer;

a second storage circuit having a second data holding circuit which temporarily stores data to be inputted into said second input/output circuit and a second buffer which outputs the temporarily stored data to said second input/output circuit in response to a second output control signal, said second data holding circuit being connected to an input terminal of said second buffer; and a transfer control circuit which supplies the first output control signal at a predetermined timing so as to control a transfer of data outputted from said second input/output circuit to said first input/output circuit, and said transfer control circuit supplies the second output control signal at a predetermined timing so as to control a transfer of data outputted from said first input/output circuit to said second input/output circuit, wherein said transfer control circuit includes means for causing said first and second data holding circuits to hold data before said first and second output control signals restrict outputs to said first and second data input/output circuits, and for supplying said first and second output control signals to said first and second storage circuits when data inputs to said first and second data input/output circuits are established.

4. An apparatus according to claim 3, wherein said transfer control circuit includes a selecting circuit which selectively transfers plural pieces of transfer data between said first data input/output circuit and said second data input/output circuit.

5. An apparatus according to claim 3, wherein a feedback loop is formed at a time of data transfer, the feedback loop being formed between said first storage circuit and said second storage circuit.

6. An apparatus according to claim 3, wherein one of said first data holding circuit and said second data holding circuit includes a flip-flop circuit.

7. An apparatus according to claim 3, wherein one of said first buffer and said second buffer includes a tri-state buffer.

8. An apparatus according to claim 3, wherein said transfer control circuit includes an information processor controlled by a program stored in a memory.

9. An apparatus according to claim 3, wherein at least one of said first and second data input/output circuits is connected to an IC card including a memory.

10. An apparatus according to claim 3, wherein at least one of said first and second data holding circuits includes a pipeline buffer for transferring data.

* * * * *